(12) United States Patent
Okumura et al.

(10) Patent No.: US 8,488,072 B2
(45) Date of Patent: Jul. 16, 2013

(54) LIQUID CRYSTAL DISPLAY PANEL AND MANUFACTURING METHOD THEREOF

(75) Inventors: Hiroshi Okumura, Kawasaki (JP); Setsuo Kaneko, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 490 days.

(21) Appl. No.: 12/418,052

(22) Filed: Apr. 3, 2009

(65) Prior Publication Data

US 2009/0251626 A1  Oct. 8, 2009

(30) Foreign Application Priority Data

Apr. 7, 2008  (JP) ................. 2008-099480

(51) Int. Cl.
*G02F 1/1335* (2006.01)
*G02F 1/1337* (2006.01)
*G02F 1/1339* (2006.01)
*H01L 21/00* (2006.01)

(52) U.S. Cl.
USPC .............. 349/15; 349/95; 349/153; 349/190; 349/191

(58) Field of Classification Search
USPC ................. 349/15, 95, 153, 190, 191; 438/30
See application file for complete search history.

(56) References Cited

U.S. PATENT DOCUMENTS

| 6,108,063 | A * | 8/2000 | Yuuki et al. ............... 349/95 |
| 6,437,918 | B1 * | 8/2002 | Hamanaka et al. .......... 359/620 |
| 6,791,639 | B2 * | 9/2004 | Colgan et al. .............. 349/95 |
| 2003/0214615 | A1 | 11/2003 | Colgan et al. |
| 2006/0268196 | A1 * | 11/2006 | Jung ........................ 349/95 |
| 2008/0036945 | A1 * | 2/2008 | Chen ........................ 349/95 |
| 2008/0176364 | A1 * | 7/2008 | Yang et al. ................ 438/151 |

FOREIGN PATENT DOCUMENTS

| CN | 1459653 A | | 12/2003 |
| JP | 6-332354 A | | 12/1994 |
| JP | 10-268247 A | | 10/1998 |
| JP | 2000031004 A | * | 1/2000 |
| JP | 2004-4745 A | | 1/2004 |
| JP | 2005-208567 A | | 8/2005 |

OTHER PUBLICATIONS

First Office Action dated Sep. 7, 2011, issued by the State Intellectual Property Office of the People's Republic of China in counterpart Chinese Patent Application No. 200910132579.6.

* cited by examiner

*Primary Examiner* — Mark Robinson
*Assistant Examiner* — Jerry Blevins
(74) *Attorney, Agent, or Firm* — Sughrue Mion, PLLC

(57) ABSTRACT

To provide a structure and a manufacturing method which can manufacture, at a low cost and with good yield, a liquid crystal display panel having a lenticular lens and a substrate formed in a unified manner. When forming a lenticular lens onto a mother CF substrate by using a wet etching method, substrates are dipped into an etching solution while being raised up in such a manner that the length direction of slit openings of a mask is aligned with a vertical direction and an area having no mask pattern comes on a bottom side. With this, the residuals generated due to glass impurities can be drained towards the lower side along the lenticular lens shape to be discharged to the flat area, which makes it possible to suppress deterioration in the etching processed shape.

5 Claims, 14 Drawing Sheets

LIQUID CRYSTAL DISPLAY PANEL AND MANUFACTURING METHOD THEREOF

CROSS-REFERENCE TO RELATED APPLICATION

This application is based upon and claims the benefit of priority from Japanese patent application No. 2008-099480, filed on Apr. 7, 2008, the disclosure of which is incorporated herein in its entirety by reference.

BACKGROUND OF THE INVENTION

1. Field of the Invention

The present invention relates to a liquid crystal display panel having a lenticular lens mounted on its display surface, and to a manufacturing method of the same.

2. Description of the Related Art

Recently, there have been active developments conducted on a display device which provides different images towards a plurality of viewpoints. For example, Japanese Unexamined Patent Publication 6-332354 (paragraphs 0070-0073, FIG. 10: Patent Document 1) discloses a display device which simultaneously provides different images for a plurality of observers located at different positions, and Japanese Unexamined Patent Publication 2005-208567 (paragraph 0101: Patent Document 2) discloses a display device which sends different images for left and right eyes of an observer for allowing the observer to recognize the images as a stereoscopic image. Both of those display devices utilize a lenticular lens comprises a plurality of semi-cylindrical lens which images provided for each direction are synthesized and images are distributed to corresponding directions.

FIG. 14 is a sectional view showing a structure of a liquid crystal display panel to which a lenticular lens as a independent part is loaded. The liquid crystal display panel shown in FIG. 14 is formed in a structure in which a thin-film transistor (referred to as TFT hereinafter) substrate 36 and a color filter substrate 30 (referred to as CF substrate hereinafter) are laminated via a seal member 32, and a twisted nematic (referred to as TN hereinafter) liquid crystal 34 is sealed between both substrates.

The TFT substrate 36 has, facing to a surface of the CF substrate 30 side, a thin-film element area 37 on which a TFT pixel switch array, signal lines, scanning lines, a pixel electrode, a TFT driving circuit, and the like are formed. An alignment film 39 on which rubbing processing has been done is printed on a part of the surface of the TFT substrate 36 facing to the CF substrate side 30 where the TN liquid crystal 34 is sealed, and a polarizing plate 38 is provided on the opposite-side surface.

In the meantime, the CF substrate 30 has, facing to the surface of the TFT substrate 36 side, a counter electrode forming layer 35 on which a counter electrode, a metal light-shielding film, and the like are formed. A CF layer 31 configured with a color layer, a black matrix, an overcoat layer, and the like is provided on a part of the surface on the TFT substrate 36 side where the TN liquid crystal 34 is sealed, and the alignment film 39 to which rubbing processing has been done is coated on the surface. Further, the polarizing plate 38 and a lenticular lens 33 are provided on the opposite-side surface of CF substrate 30.

However, since such liquid crystal display panel is formed by laminating the separately-formed lenticular lens 33 onto the CF substrate 30, there are some issues generated in terms of thermal expansion in parallax, increase in the weight, lack of long-term reliability in the laminated layers, etc. Japanese Unexamined Patent Publications 10-268247 (paragraphs 0049-0052, FIG. 2: Patent Document 3) and 2004-4745 (paragraphs 0107-0116, FIG. 1: Patent Document 4) disclose examples of techniques which can improve such issues. The techniques disclosed in Patent Document 3 and Patent Document 4 form a lens shape by performing wet etching on a glass substrate by using HF (hydrofluoric acid) solution. By applying such techniques, it is possible to form the lenticular lens shape on the surface of the CF substrate (glass substrate) in a unified manner.

However, unlike a quartz glass substrate formed only with $SiO_2$, a normal glass substrate for a liquid crystal display panel contains oxides such as Al (Aluminum), Ba (Barium), Ca (calcium), Sr (Strontium) as impurities in addition to having $SiO_2$. Thus, when performing wet etching process by using the HF solution, residuals such as $AlF_3$, $BaF_2$, $CaF_2$, $SrF_2$, and the like are generated and remained, which cause deterioration in the etching shape controllability. This results in lowering the yield rate of the liquid crystal display panels each having the lenticular-lens unified substrate.

In order to avoid influences of the residuals, Patent Document 3 discloses a glass substrate not containing Ba. However, as described above, the residual-forming impurity on the normal glass substrate used for the liquid crystal display panel is not only Ba. Further, the Ba-less glass is expensive so that the cost is increased.

SUMMARY OF THE INVENTION

The present invention has been designed in view of the foregoing issues, and it is a liquid crystal display panel having a lenticular lens and on the surface of a glass substrate formed in a unified manner. It is an exemplary embodiment of the present invention to provide a liquid crystal display panel and a manufacturing method thereof, which can improve the quality and the yield rate by avoiding influences of generated residuals without increasing the cost at the time of wet etching performed during manufacturing the panels.

In order to achieve the foregoing exemplary object, the liquid crystal display panel according to an exemplary aspect of the invention is a liquid crystal display panel formed in a structure where a liquid crystal layer is sealed between a first glass substrate and a second glass substrate, wherein: the first glass substrate has a lenticular-lens shape recessed part in which a plurality of recessed semi-cylindrical lens are arranged in parallel and at least one of axial end of the semi-cylindrical lens is opened, facing to a surface that is an opposite-side from the liquid crystal layer side, and has a flat part provided adjacent to the open-end face side of the recessed lenticular-lens part; and a substrate thickness in the flat part is equal to or less than a substrate thickness in a bottom part of the recessed lens part.

Further, the liquid crystal display panel manufacturing method according to another exemplary aspect of the invention is a liquid crystal manufacturing method which includes a substrate laminating step for laminating a first glass substrate and a second glass substrate, and a liquid crystal sealing step for injecting and sealing a liquid crystal between the first glass substrate and the second glass substrate. The featured method is structured to execute: a mask forming step for forming an etching mask on a surface of the first glass substrate, which is an opposite-side surface from a surface laminated with the second glass substrate; an etching step for applying wet etching on each outer-side surface of both of the laminated substrates after executing the substrate laminating step; and a mask removing step from the first glass substrate glass after completing the etching. In the mask forming step, the mask is formed in which a plurality of slit-like openings having at least one of end parts is opened are arranged in parallel being aligned as facing to same directions of the opened end. In the etching step, the both of the laminated substrates are placed in such a manner that the opened end side of the slit-like openings of the mask faces downwards and a slit length direction is suspended with a vertical direction, and the wet etching is applied to each outer-side surface of the both glass substrates in this state to form a lenticular-lens recessed part which corresponds to a shape of the mask on the surface of the first glass substrate.

DETAILED DESCRIPTION OF THE EXEMPLARY EMBODIMENTS

An exemplary embodiment of the present invention will be described hereinafter by referring to the accompanying drawings.

Figure 1:
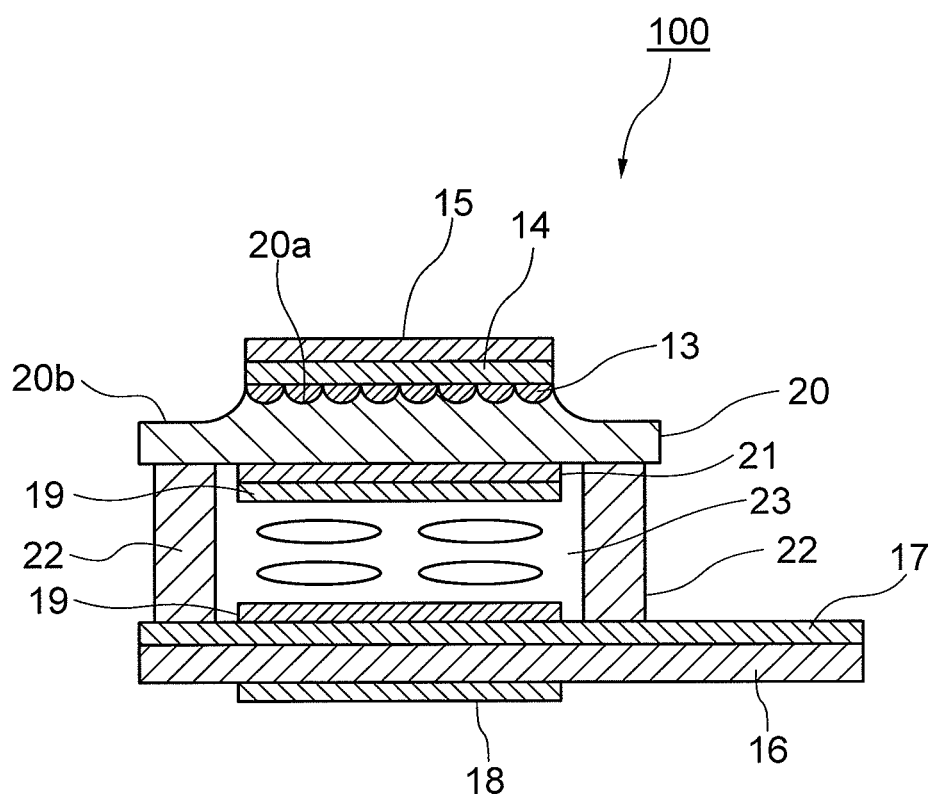
FIG. 1 is a sectional view showing a structure of a liquid crystal display panel according to an exemplary embodiment of the invention.
Figure 2:
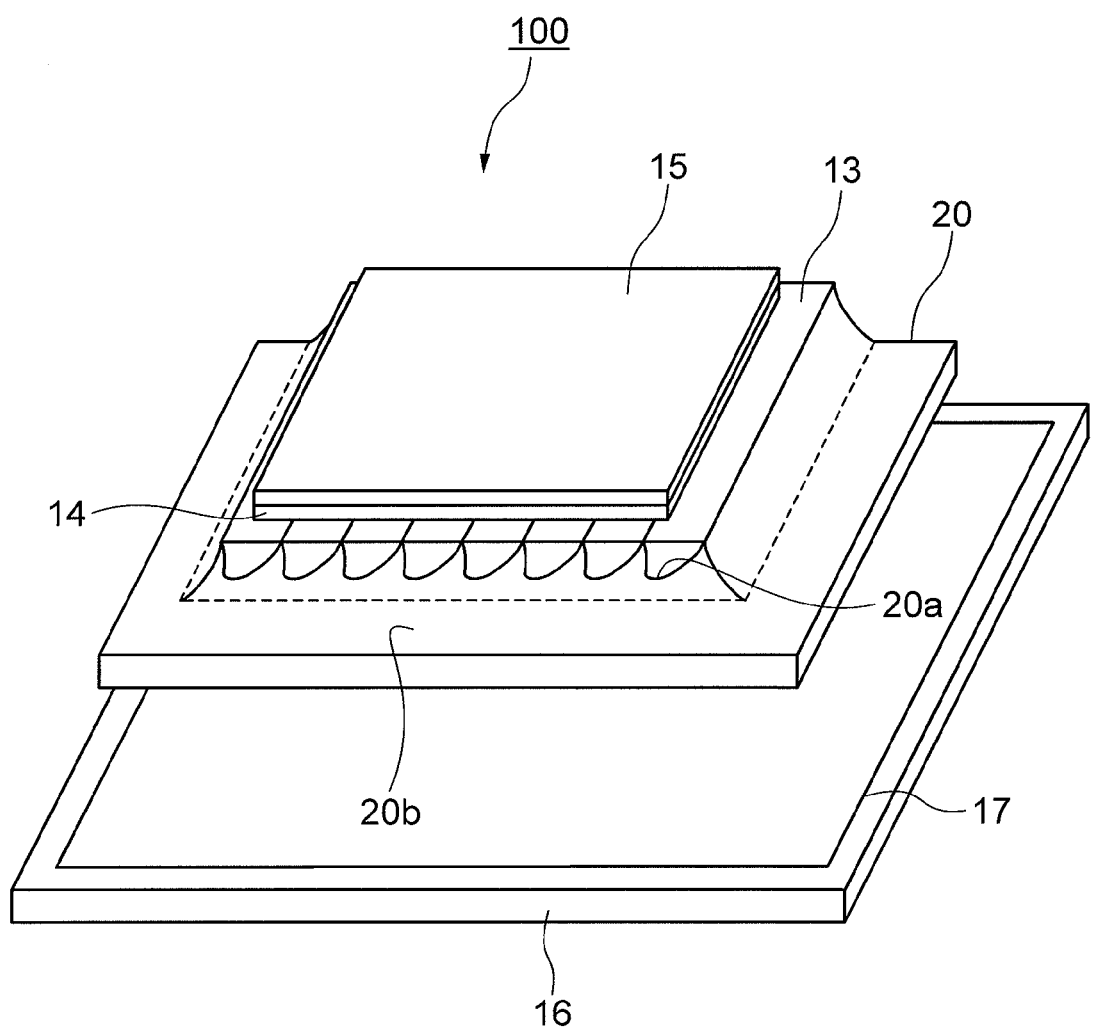
FIG. 2 is a perspective view showing the structure of the liquid crystal display panel disclosed in FIG. 1.

FIG. 1 is a sectional view showing a structure of a liquid crystal display (LCD) panel according to this exemplary embodiment. FIG. 2 is a perspective view of the LCD panel shown in FIG. 1.

As shown in FIG. 1 and FIG. 2, a LCD panel 100 of this exemplary embodiment has a color filter substrate 20 (referred to as CF substrate hereinafter) as a first glass substrate and a thin film transistor (referred to as TFT hereinafter) substrate 16 as a second glass substrate laminated via a seal member 22. A liquid crystal 23 is sealed between the both substrates to form a liquid crystal layer 23. The area of the surface of the TFT substrate 16 is formed larger than that of the CF substrate 20 for mounting FPC (flexible printed circuits) on the TFT substrate 16.

The TFT substrate 16 has, on a surface of the CF substrate 20 side, a thin-film element area 17 on which a TFT pixel switch array, signal lines, scanning lines, a pixel electrode, a common electrode, a TFT driving circuit, and the like are formed. An alignment film 19 on which a rubbing processing has been done is printed on a part of the surface which is in contact with the liquid crystal layer 23. Further, a polarizing plate 18 is provided on a surface of the TFT substrate 16 that is the opposite side from the liquid crystal layer 23 side.

The liquid crystal display panel 100 has the pixel electrode and the common electrode in the thin-film element area of the TFT substrate 16, and it is formed to drive with the IPS (In-Plane Switching) mode by having the liquid crystal molecules within the liquid crystal layer 23 aligned in parallel to the substrate face.

The CF substrate 20 has a CF layer 21 configured with a color layer, a black matrix, an overcoat layer, and the like formed on the liquid crystal layer 23 side, and the alignment film 19 to which rubbing processing has been done is coated on the surface of the CF layer 21. Further, as shown in FIG. 2, on the opposite-side surface of the liquid crystal layer 23, the CF substrate 20 has a recessed lenticular-lens part 20a in which a plurality of the recessed semi-cylindrical are arranged in parallel and the same end faces of all of those recesses are opened, and has a flat part 20b provided in the periphery thereof including the side where the end faces of the recessed lenticular-lens are opened.

The CF substrate 20 has the lenticular-lens recessed part 20a as a display screen area that is exposed as a display screen when the liquid crystal display panel 100 is actually used as a part of a liquid crystal display, and has the flat part 20b as an area that is concealed by a frame when it is used for the liquid crystal display.

In the liquid crystal display panel 100, a transparent resin 13 having a higher refractive index than that of the CF substrate 20 is embedded in the lenticular-lens recessed part 20a of the CF substrate 20 for forming a lenticular lens. As described, the CF substrate 20 is formed as a substrate with a lenticular lens provided in a unified manner, which has an improved long-term reliability compared to the case where a separate lenticular lens is laminated on the surface of a substrate.

FIG. 1 and FIG. 2 show the size of the semi-cylindrical lens convexes in a different ratio from that of the actual ratio with respect to the substrate 20. The actual pitch of each semi-cylindrical lens convex of the lenticular-lens recessed part 20a is set by corresponding to the pixel pitch of the TFT.

Further, in the liquid crystal display panel 100 of this exemplary embodiment, a back-face ITO (Indium Tin Oxide) 14 is provided on the display screen area of the surface of the transparent resin 13 embedded in the CF substrate 20, and a polarizing plate 15 having an anti-reflecting function is laminated on the surface of the back-face ITO 14. The back-face ITO 14 is a transparent conductive film, and it has a shielding function for external static electricity and the like in the case of a lateral electric field drive mode such as the IPS mode.

As described, in the liquid crystal display panel 100 of this exemplary embodiment, the CF substrate 20 has the lenticular-lens recessed part 20a and the flat part 20b provided in the periphery of the lenticular-lens recessed part 20a formed in the surface that is on the opposite side from the liquid crystal layer 23 side.

By forming the CF substrate 20 into such configuration, it is possible to drain the generated residuals due to the impurities of the glass substrate along the lenticular lens shape to be discharged from the flat part 20*b* through the open end, when directly forming the lenticular-lens recessed part 20*a* onto the CF substrate 20 by wet etching. This makes it possible to suppress the deterioration in the processed shape of the recessed part 20*a* by lightening the influence of the residuals in the lenticular-lens recessed part 20*a*.

With this, the lenticular lens in the display screen area of the CF substrate 20 of the liquid crystal display panel 100 of this exemplary embodiment can be formed in a precisely curved-face shape, which can provide a fine quality.

When forming a lenticular lens structure in the CF substrate 20, a patterning using some kind of mask material is formed on the surface of the CF substrate 20. Normally, an etching rate of a lens forming area having a patterning is more deteriorated compared to the etching rate of a flat area having no patterning. This is because it is typical that the deterioration of an etching solution is accelerated locally by the mask scale effect. Therefore, the thickness of the substrate of the residual-discharging flat part 20*b* in the CF substrate 20 becomes thinner than that of the bottom part of the lenticular-lens recessed part 20*a*. As a result, the thickness in the CF substrate 20 takes three-step values.

Next, a manufacturing method of the liquid crystal display panel according to this exemplary embodiment will be described.

FIG. 3-FIG. 6 are illustrations which sequentially shows steps of the manufacturing method of the liquid crystal display panel 100 according to this exemplary embodiment. FIG. 7-FIG. 10 are sectional views showing examples of the shape of the CF substrate in the manufacturing process of the liquid crystal display panel 100 of this exemplary embodiment.

Figure 3:
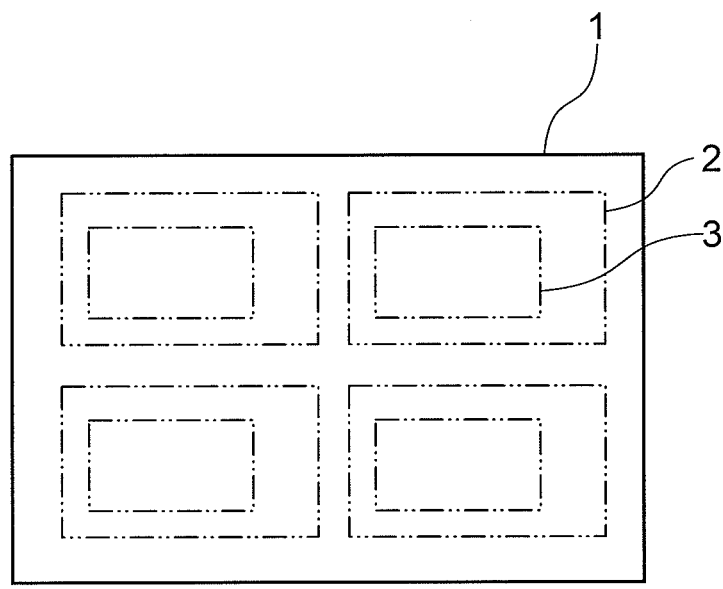
FIG. 3 is an illustration showing an initial step of a manufacturing method of the liquid crystal display panel as the exemplary embodiment of the invention.

FIG. 3 is a plan view showing a mother CF substrate 1 from which four pieces of the CF substrates 20 can be cut out.

The mother CF substrate 1 has a panel forming area 2 that is finally being cut into separate liquid crystal display panel 100. Each of the panel forming areas 2 has a display screen area 3 which is exposed as the display screen, when the liquid crystal display panel 100 is actually formed as a liquid crystal display. In the mother CF substrate 1, a CF (color filter) 21, an alignment film 19 to which rubbing processing has been done, and the like are formed within each display screen area 3 on one of the surfaces, and this is the surface laminated with the TFT substrate 16. The opposite-side surface remains as a flat glass surface. As the color layer of the CF 21, red, green, and blue are used for a typical color display. Further, there is also a case where a color layer is not specifically used, i.e., a case of black and white display.

(Mask Forming Step)

Figure 4:
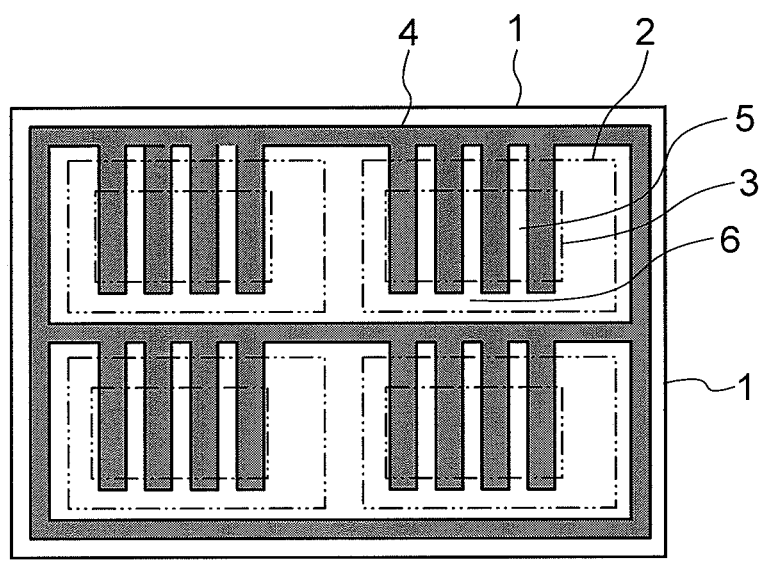
FIG. 4 is a mask forming step of the manufacturing method of the liquid crystal display panel as the exemplary embodiment of the invention.

First, as shown in FIG. 4, etching masks 4 are formed on the flat surface of the mother CF substrate 1. As the mask material, a resist, Cr (Chromium), Si (Silicon), or the like is used. When Cr or Si is used, a Cr or Si film is deposited once, patterning is formed by the resist, and etching is performed by dry etching to form the mask 4.

As shown in FIG. 4, the masks 4 are formed in such a pattern shape which has, in the display screen area 3, a plurality straight-line slits arranged in parallel and openings having at least the ends of one side all opened, and the area within the panel forming area 2 except the display screen area 3 is unprotected.

Through forming the pattern shape of the masks 4, the display screen area 3 is formed as a lens forming area 5, and the area that is not protected by the peripheral masks 4 is formed as a flat area 6 that is etched flat.

As shown in FIG. 4, the other-end side of the slits forms a comb-like shape by having the masks 4 being connected. This reason is to avoid a risk of having the masks 4 being exfoliated after performing the etching, when the masks 4 are formed as isolated patterns of the display screen area 3. If the masks 4 can be prevented from being exfoliated by using other method, it is also possible to provide openings on the other end-part side of the slits. Further, the flat area 6 in the arranging direction where the slits are arranged in parallel is not necessary to be etched in terms of the etching residuals.

FIG. 4 shows the size of the width of the slit openings different from the actual ratio with respect to the mother CF substrate 1. The actual number and width of the slit openings are set in accordance with the pitch of the recesses of the lenticular-lens recessed part 20*a*. This is the same for FIG. 5 and FIG. 6.

(Substrate Laminating Step)

Figure 5:
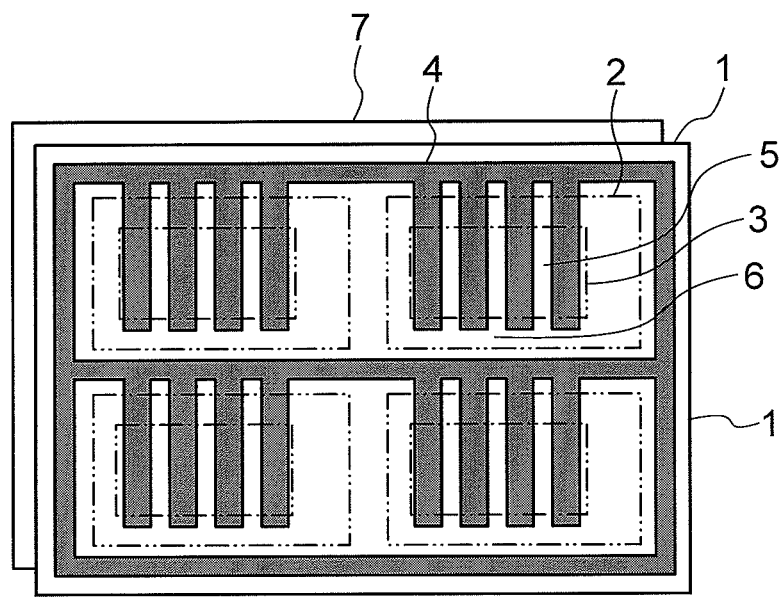
FIG. 5 is a substrate laminating step of the manufacturing method of the liquid crystal display panel as the exemplary embodiment of the invention.

Subsequently, as shown in FIG. 5, the mother CF substrate 1 (the opposite-side surface of the mask forming surface) and the mother TFT substrate 7 are laminated via a seal member. On the mother TFT substrate 7, the thin-film element forming layer 17 configured with the TFT pixel switching array, the signal lines, the scanning lines, the pixel electrode, the common electrode, the TFT driving circuit, and the like, as well as the alignment film 19, etc. are already being formed. A liquid crystal may be inserted between the both substrates at this point or may be inserted after the laminated substrates are cut into each panel.

(Etching Step)

Figure 6:
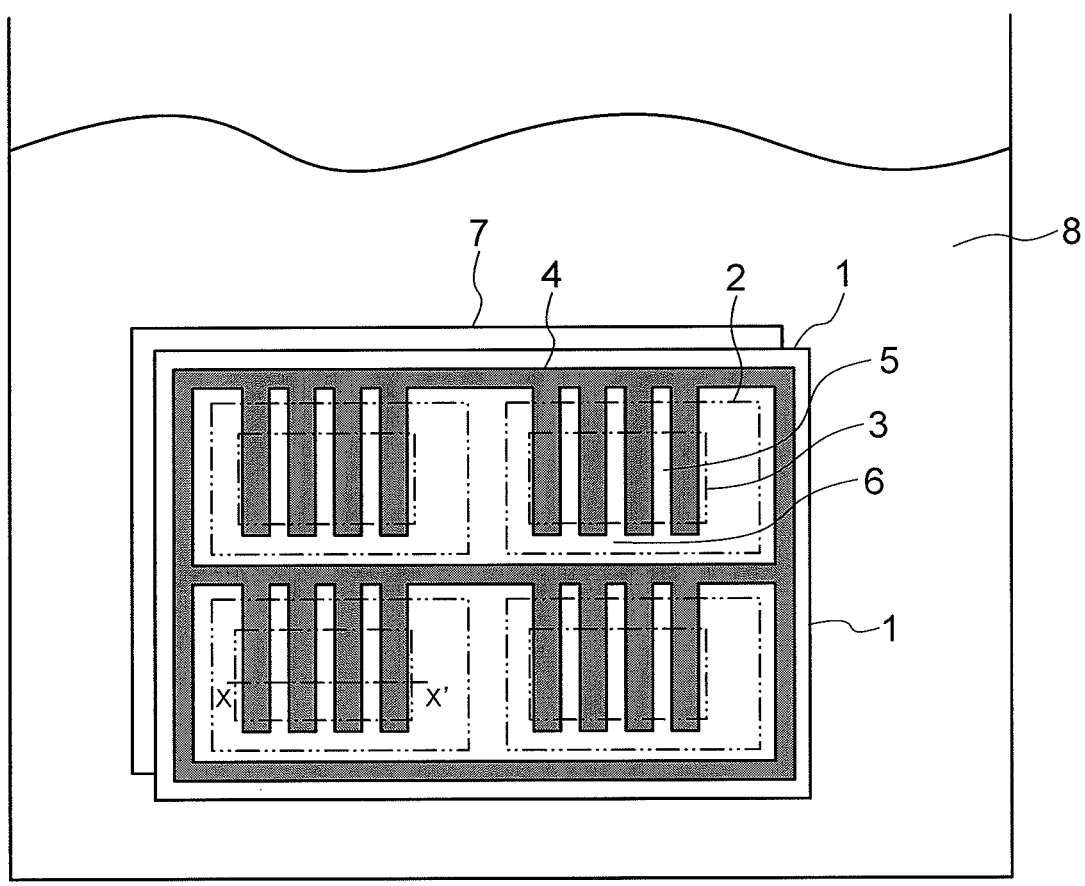
FIG. 6 is a wet etching step of the manufacturing method of the liquid crystal display panel as the exemplary embodiment of the invention.

After tentatively sealing the end faces of the laminated substrates, as shown in FIG. 6, the substrates are raised up in such a manner that the length direction of the slit-like openings (major axis direction of the lenticular lens) of the pattern of the masks 4 formed on the mother CF substrate 1 is aligned with a vertical direction, and the open end part of the slit-like openings is aligned with the bottom side. Further, as shown in FIG. 6, the both substrates being raised up are dipped into an etching solution 8 to perform etching.

In this manner, the light-weight liquid crystal display panels can be manufactured without increasing the number of steps, by simultaneously etching the mother CF substrate 1 and the mother TFT substrate 7. Further, if there is a large difference between the thickness of the mother CF substrate 1 and that of the mother TFT substrate 7, there may be generated a warp in the liquid crystal display panels due to uneven stresses of the substrates, etc. Therefore, it is preferable to perform etching simultaneously.

The etching solution 8 is a solution with 9.8% of HF and 14.4% of HCl (hydrochloric acid). When the substrate materials for the mother CF substrate 1 and the mother TFT substrate 7 is quartz ($SiO_2$), a solution containing only HF may be used. However, in addition to $SiO_2$, a normal glass substrate used for a liquid crystal contains oxides such as Al, Ba, Ca, and Sr as the impurities. Thus, it is desirable to use a solution in which HCl having an effect of suppressing generation of residuals of fluorides of Al, Ba, Ca, Sr, and the like is added along with HF. Through suppressing the generation of the residuals of the fluorides, deterioration of the etching rate, having rough etching surface, and the like also can be suppressed.

Figure 7:
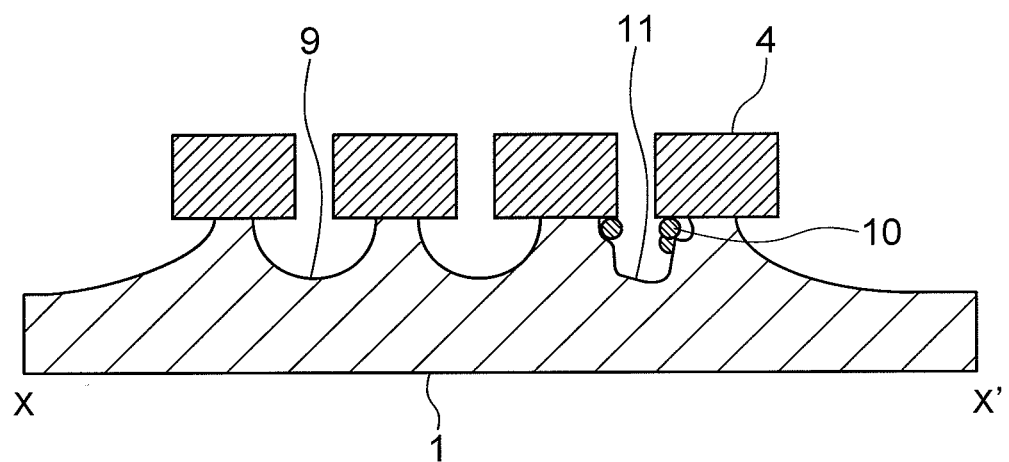
FIG. 7 is a sectional view showing an X-X' section of a CF substrate shown in FIG. 6 while etching is performed.

FIG. 7 is an illustration showing an example of a state of an X-X' section of the mother CF substrate 1, which is dipped into the etching solution 8 as shown in FIG. 6. In FIG. 7, the CF 21, the alignment film 19, and the like provided on the surface of the mother CF substrate 1 are omitted.

As shown in FIG. 7, the wet etching progresses in an isotropic manner. Thus, a smooth curvature is formed in a part 9 of the mother CF substrate 1 where the etching progresses normally. In the meantime, when a residual 10 generated by fluorides of the glass impurities is stuck on the etching surface, etching in the residual stuck residual portion is locally masked from proceeding. This generates an abnormal etching part 11 having a distorted shape.

In this exemplary embodiment, when the mother CF substrate 1 and the mother TFT substrate 7 are dipped into the etching solution 8, the length direction of the slit-like openings of the masks 4 formed in the display screen area 3 is suspended with the vertical direction, and the side having no protection of mask 4 of the slit ends is aligned on the bottom side in order to suppress the stiking of the residuals occurred during the wet etching. With this, the residuals generated in the lenticular-lens forming area 5 are flown towards the bottom side along the recessed lenticular lens structure because of the gravity, and then discharged to the flat area 6. As a result, generation of a shape distorted part 11 can be avoided.

Therefore, it is possible with the manufacturing method of this exemplary embodiment to have a more remarkable improvement in the yield rate of forming the lens substrates, compared to the case of using a wet etching method in which the substrates are dipped into the etching solution 8 by being placed horizontally. It is also possible to achieve more residual discharging effect by causing fluctuation of the substrates or applying ultrasonic waves of about Megahertz frequency at the time of etching, for example.

(Mask Removing Step)

Figure 8:
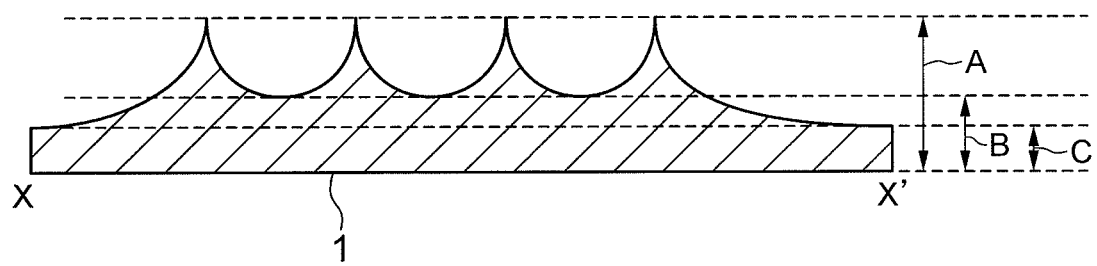
FIG. 8 is a sectional view showing an X-X' section of the CF substrate shown in FIG. 6 when etching is completed.

Subsequently, the mother CF substrate 1 and the mother TFT substrate 7 are taken out from the etching solution 8, and the laminated substrates are placed horizontally with the mother CF substrate 1 facing upwards to remove the masks 4. FIG. 8 is a sectional view showing the X-X' section of the mother CF substrate 1 after the etching is completed and the masks 4 are removed.

In the lenticular-lens forming area 5 on the surface of the mother CF substrate 1, uneven shapes corresponding to the lenticular-lens recessed part 20 shown in FIG. 2 are formed. The uneven shapes are periodic shapes having a substrate thickness A in the protruded part and a substrate thickness B in the bottom part of the recessed part.

The substrate thickness B in the bottom part of the recessed part is set thicker than a substrate thickness C of the flat area 6 that is not protected by the masks 4, because the deterioration of the etching solution 8 is accelerated locally by the scale effect of the openings formed by the masks 4 and as result, the etching rate goes down. Thereby, there are the areas with the substrate thicknesses of three steps having the sizes of A, B, and C formed in the mother CF substrate 1 at last.

Thereafter, etching may be applied further after removing the masks when necessary, as disclosed in Patent Document 3. There is no difference also in this case in respect that there are three-step substrate thicknesses in the mother CF substrate 1.

Regarding the mother TFT substrate 7 etched simultaneously, the etching amount thereof becomes equivalent to that of the flat area 6 of the mother CF substrate 1 if the substrate material thereof is the same as that of the mother CF substrate 1. Therefore, when the substrate thicknesses of both substrates before applying the etching are the same, the substrate thickness of the mother TFT substrate 7 after the etching becomes equivalent to the substrate thickness C of the flat area 6 of the mother CF substrate 1.

Figure 9:
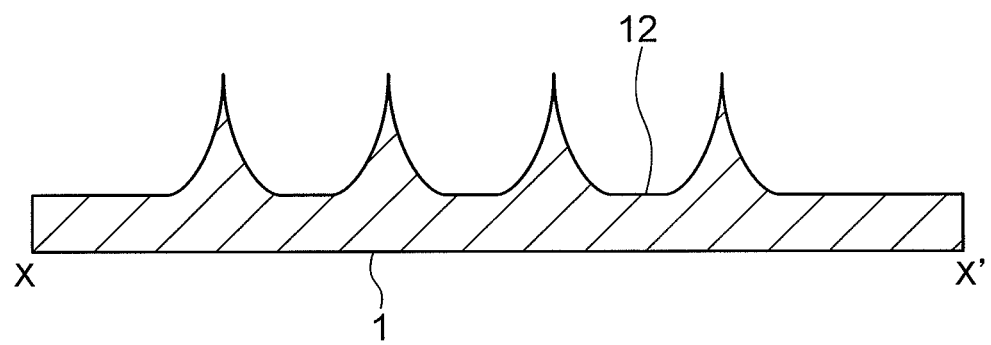
FIG. 9 is a sectional view showing an X-X' section of the CF substrate shown in FIG. 6 when etching failed.

If the slit width of the masks 4 formed in the lenticular-lens forming area 5 of the mother CF substrate 1 is excessively wide or if the wet etching is performed over an excessive length of time, a flat surface 12 is formed in the bottom part of the recess which is expected to be formed as a curved surface, as shown in FIG. 9.

The pitch of the recesses to be formed is set to be the same as the pixel pitch of the TFT. Thus, normally, the slit width of the masks 4 is set in a range from several orders of μm to the first-half tens of orders of μm (from 2 μm to 30 μm to the utmost). If the slit width becomes the latter-half hundreds of orders of μm (about 700 μm) or more, there is a flat surface formed in the bottom part of the recess as shown in FIG. 9. In that case, the scale effect of the masks 4 becomes ineffective, and the substrate thicknesses are formed in two-steps thicknesses. When the flat surface 12 is formed in the bottom part of the recessed portion, the light converging property when forming the lens later on becomes lost. Therefore, it is necessary to control the slit width and the etching time.

Subsequently, the tentative sealing applied at the laminated end faces of the mother TFT substrate 7 and the mother CF substrate 1 is released, and the substrates are cut into each panel area 2.

(Lenticular Lens Forming Step)

Figure 10:
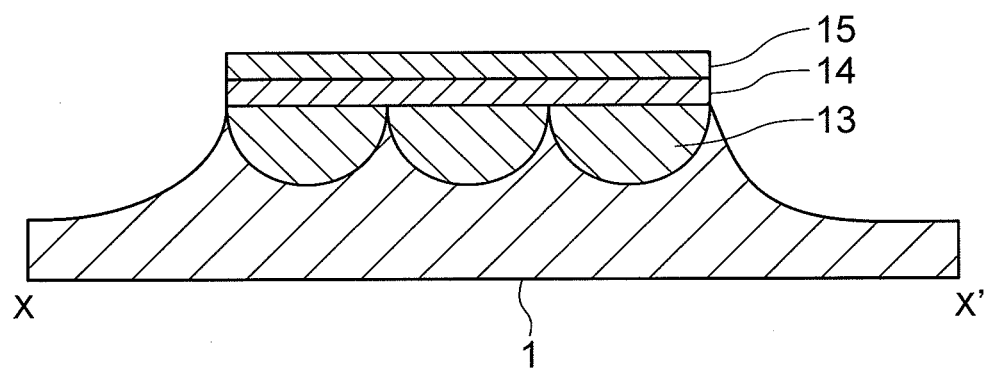
FIG. 10 is a sectional view showing an X-X' section of the CF substrate shown in FIG. 6 after a transparent resin is filled.

Then, as shown in FIG. 10, the transparent resin 13 having a higher refractive index than that of the mother CF substrate 1 is applied and sintered to be embedded into the recessed portion formed on the surface of the mother CF substrate 1 so as to form a lenticular lens. Thereafter, the back-face ITO 14 is formed by being applied through an ink jet method and sintered. The polarizing plate 15 having an anti-reflecting function is laminated on the surface thereof.

The substrates may be cut into panels after embedding the transparent resin 13 to the recessed portion, after forming the back-face ITO 14, or after laminating the polarizing plate 15.

The back-face ITO 14 is a conductive-layer thin film having a translucency for preventing electrification of the CF substrate 20 in the case of a lateral electric field mode such as the IPS mode. Any types of conductive-layer thin films may be used as long as the films have the conductivity and do not deteriorate the light transmittance greatly. The polarizing plate 15 is put on the outermost surface, so that it is provided with the anti-reflecting function. Instead, an anti-reflecting plate may be provided on a typical polarizing plate. However, considering the cost and the yield rate, it is preferable to use the polarizing plate that is provided with the anti-reflecting function. Further, a retardation plate may be provided between the polarizing plates 18, 15 and each of the substrates.

Note here that the driving mode of the liquid crystal display panel 100 may not necessarily have to be the IPS mode but also may be a TN mode. Alternatively, liquid crystal driving modes other than the IPS mode or the TN mode, e.g., a VA mode or an FFS mode, may be employed as well. When a driving mode other than the IPS mode is employed, a common electrode is not provided in the thin-film element forming layer 17 of the TFT substrate 16, a counter electrode is formed on the surface of the CF substrate 20 on the liquid crystal layer 23 side, and the back-face ITO 14 becomes unnecessary. However, the back-face ITO 14 can also be used as a touch panel.

With the manufacturing method of the liquid crystal display panel 100 according to this exemplary embodiment, when forming the lenticular lens onto the mother CF substrate 1 by using the wet etching method, the substrates are dipped into the etching solution 8 while being raised up in such a manner that the long axis direction of the slit openings of the masks 4 is aligned to be suspended with the vertical direction and the area 6 having no mask pattern comes to the bottom side. With this, the residuals generated due to the glass impurities during the wet etching can be drained towards the bottom side along the lenticular lens shape to be discharged to the area 6, which makes it possible to suppress generation of the etching-shape distorted part 11. As a result, the processing accuracy of the lenticular lens shape, the uniformity of etching, the reproduction rate of the recessed portion, as well as the yield rate can be improved totally.

Regarding the etching step described above, it is also possible to employ an etching method which sprays the etching solution 8 towards the both substrates by using a shower nozzle, instead of dipping the mother TFT substrate 7 and the mother CF substrate 1 into the etching solution 8.

Figure 11:
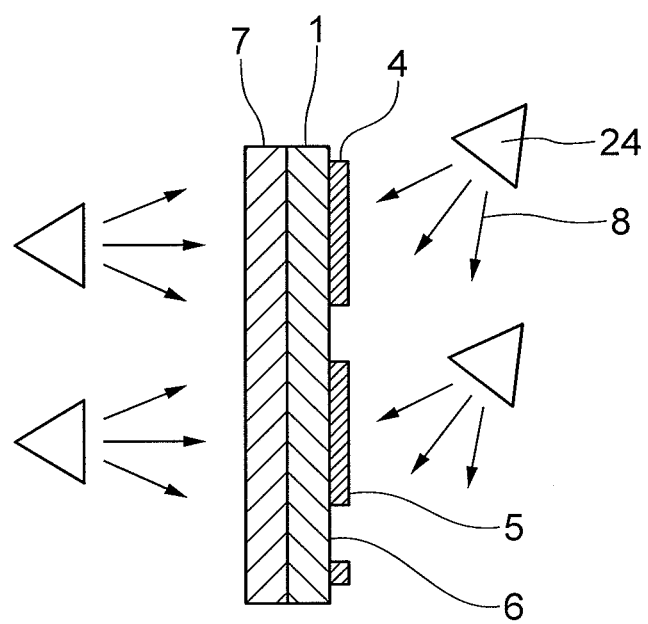
FIG. 11 is another example of the wet etching step of the manufacturing method of the liquid crystal display panel as the exemplary embodiment of the invention.

FIG. 11 is an illustration showing a method of the spray wet etching using a shower nozzle.

The substrates are placed by having the length direction of the slits of the masks 4 aligned with the vertical direction, and the etching solution 8 is sprayed against the mother CF substrate 1 and the mother TFT substrate 7 from a shower nozzle 24. The spray direction of the shower nozzle 24 at this time is facing towards the lower direction. Thus, the residuals generated in the lenticular-lens forming area 5 are drained towards the lower side along the flow of the liquid, and discharged from the flat area 6. In the meantime, the mother TFT substrate 7 is etched flat, so that the etching solution is sprayed from the nozzle 24 in an isotropic manner. Normally, a solution liquid runs down from the upper side towards the lower side on the substrate surface. Therefore, the etching amount on the whole substrate surface can be made equal with high precision by setting the sprayed amount of the nozzle located in the lower side or the etching concentration smaller. As a result, the substrate thickness of the mother TFT substrate 7 can be made uniform.

It is also possible to place both substrates horizontally while having the mother CF substrate 1 facing upwards, and to perform the wet etching processing through spraying the etching solution 8 from the shower nozzle 24 along the length direction of the slits of the masks 4 from the lenticular-lens forming area 5 towards the flat area 6. In that case, the yield of forming the lenticular lenses is deteriorated compared to the case where the substrates are raised up by having the major axis direction of the lenticular lens aligned with the vertical direction. However, the yield can be improved compared to the case of using a conventional method which sprays the etching solution 8 by placing the both substrates horizontally and simply directing the shower nozzle 24 towards the substrates in an isotropic manner.

As described, with this exemplary embodiment, it is possible to employ the method of spraying the etching solution 8 towards the mother CF substrate 1 by using the shower nozzle, when forming the lenticular-lens recessed part 20a in the mother CF substrate 1 by using the wet etching method. By setting the spraying direction of the etching solution 8 directed in a direction from the lenticular-lens forming area 5 towards the area 6 having no mask 4 along the length direction of the slit openings of the masks 4, the residual 10 generated due to the glass impurities can be discharged to the area 6. Therefore, it is possible to suppress generation of the etching-shape distorted part 11.

Next, described is a multi-viewpoint display device that is a liquid crystal display to which the above-described liquid crystal 100 is loaded.

Figure 12:
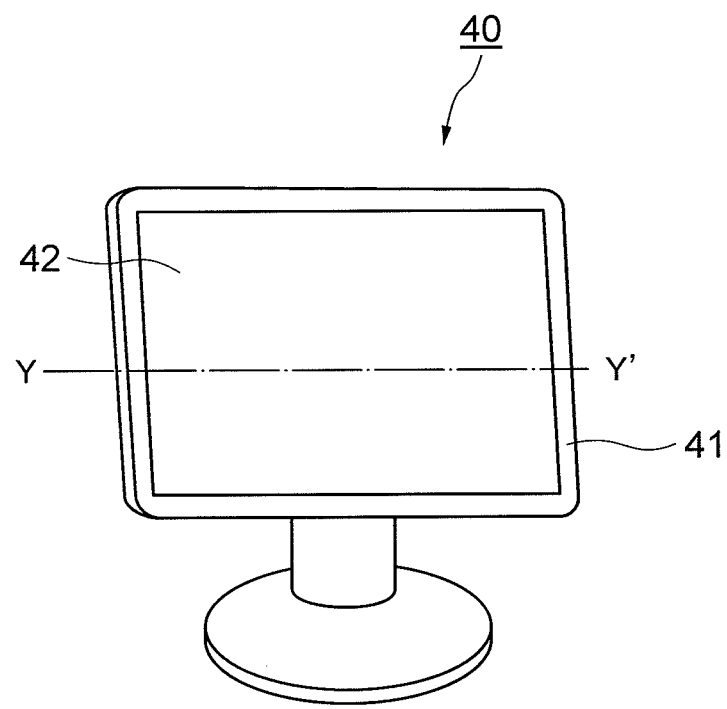
FIG. 12 is an external appearance of a multi-viewpoint display device to which the liquid crystal display panel disclosed in FIG. 1 is loaded.

FIG. 12 is an external appearance of a multi-viewpoint display device 40. Further, FIG. 13 shows a Y-Y' section view of a display screen 42 in FIG. 12, and an illustration for describing the principles of multi-viewpoints display.

The multi-viewpoint display device 40 shown in FIG. 12 is a liquid crystal display device which is also provided with a driver for supplying display signals to the liquid crystal display panel 100, a backlight, and the like. The multi-viewpoint display device 40 has the liquid crystal display panel 100 loaded thereon by having the major axis direction of the lenticular lens recessed part 20a formed on the CF substrate 20 aligned with the vertical direction, and a frame 41 is provided on the flat part 20b of the CF substrate 20.

Figure 13:
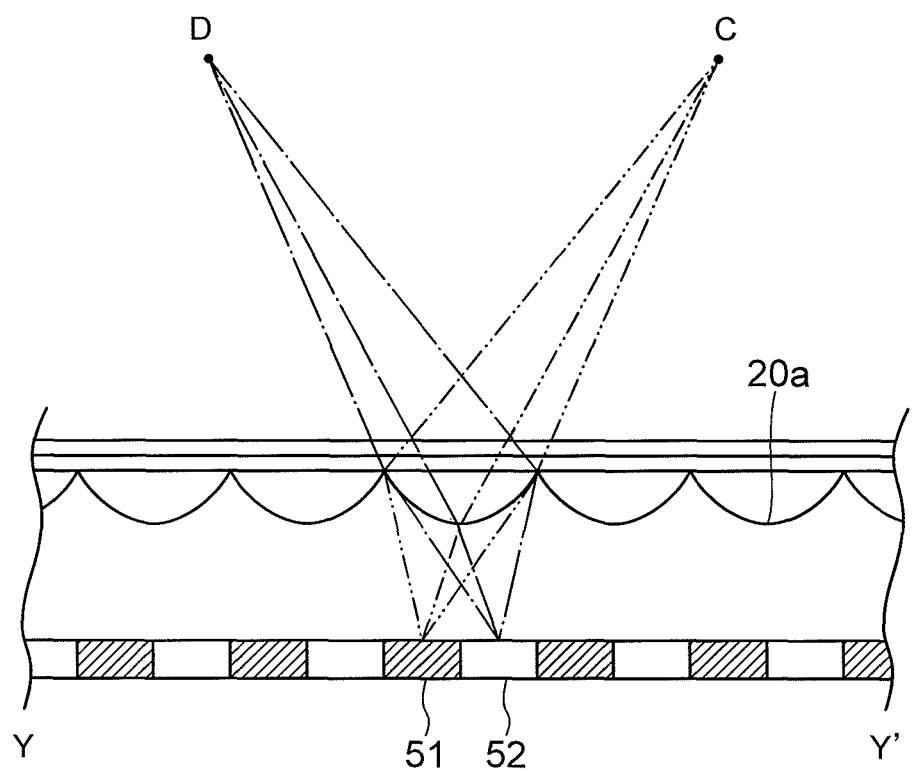
FIG. 13 shows a Y-Y' section of a display screen of the multi-viewpoint display device disclosed in FIG. 12, which is an illustration for describing the principles of display properties thereof.
Figure 14:
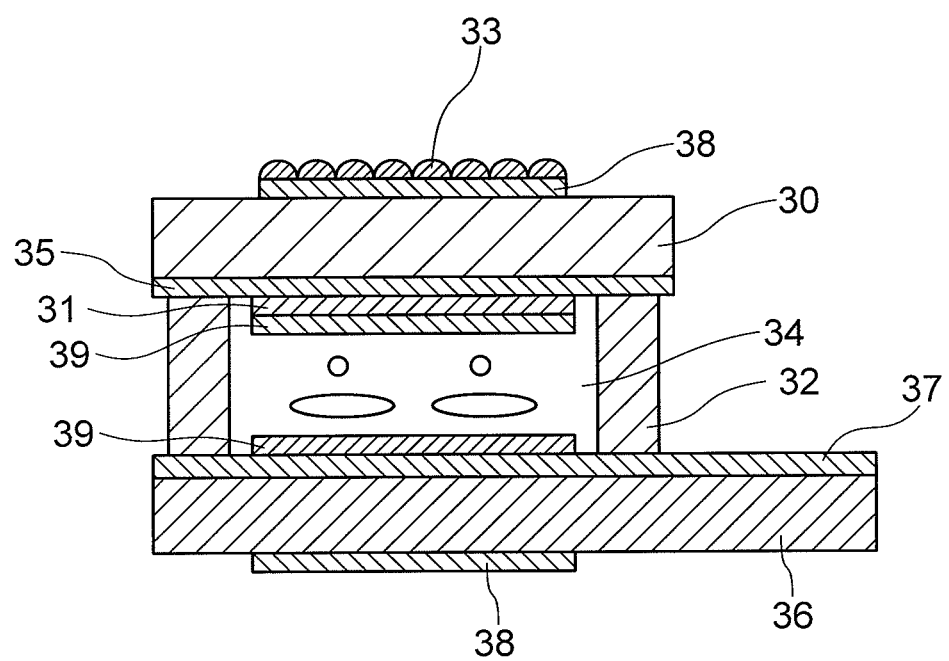
FIG. 14 is a sectional view showing a structure of a general-purpose liquid crystal display panel of related art.

As shown in FIG. 13, the liquid crystal display panel 100 is structured to have first-viewpoint pixels 51 and second-viewpoint pixels 52 at positions corresponding to the respective semi-cylindrical lenses of the lenticular lens formed on the CF substrate 20. With the lenticular-lens recessed part 20a, a video of the first-viewpoint pixel 51 is displayed towards a first viewpoint C and a video of the second-viewpoint pixel 52 is displayed towards a second viewpoint D that is different from the first viewpoint C.

The multi-viewpoint display device 40 is capable of displaying different images towards a plurality of viewpoints by displaying different images in the first-viewpoint pixel 51 and in the second-viewpoint pixel 52. It is also possible to have an observer recognize the images as stereoscopic images when different images which can generate parallax for the left and right eyes of the observer are displayed on the first-viewpoint pixel 51 and the second-viewpoint pixel 52.

As an exemplary advantage according to the invention, the residuals generated in the lenticular-lens recessed parts during the wet etching can be released to the flat part. This makes possible to lighten the influences of the residuals in the lenticular-lens recessed part, so that the etching processed shape of the recessed part can be formed in a precisely curved face. Therefore, it is possible with the present invention to provide an excellent liquid crystal display panel and a manufacturing method thereof with which the productivity and the quality of the liquid crystal display panel with a unified lenticular lens can be improved, which cannot be achieved with the conventional techniques.

The present invention is not limited to the exemplary embodiment described above. It is to be understood that any modifications are possible without departing from the scope of the technical spirit of the present invention. For example, while the color filter is formed on the CF substrate side in the above-described exemplary embodiment, the color filter can also be formed on the TFT substrate side. In that case, it is possible to achieve an effect of reducing a shift in the alignment between the color filter and the TFT.

What is claimed is:

1. A liquid crystal display panel manufacturing method, comprising a substrate laminating step for laminating a first glass substrate and a second glass substrate, and a liquid crystal sealing step for injecting and sealing a liquid crystal between the first glass substrate and the second glass substrate, the method executing:

a mask forming step for forming an etching mask on a surface of the first glass substrate, which is an opposite-side surface from a surface laminated with the second glass substrate; an etching step for applying wet etching on each outer-side surface of both of the laminated substrates after executing the substrate laminating step; and a mask removing step for removing the mask from the first substrate glass after completing the etching, wherein in the mask forming step, a plurality of slit-like openings are formed in the mask, at least one of end parts of the plurality of slit-like openings in an extending direction in a plane of the mask is opened, the slit-like openings communicate with each other through the opened end parts, and the plurality of slit-like openings are arranged parallel to the plane of the mask and facing directions of the opened end parts are aligned;

in the etching step, the both of the laminated glass substrates are placed in such a manner that the open-end side of the slit-like openings of the mask faces downwards and a slit length direction is aligned with a vertical direction, and the wet etching is applied to each outer-side surface of the both glass substrates in this state to form a lenticular-lens recessed part which corresponds to a shape of the mask on the surface of the first glass substrate, in a lenticular lens forming step which fills a transparent resin having a higher refractive index than that of the first glass substrate into the lenticular-lens recessed part formed on the surface of the first glass substrate; and residuals due to impurities of the first glass substrate are drained along a shape of the lenticular-lens recessed part through the opened end to be discharged from the flat part, when directly forming the lenticular-lens recessed part onto the first glass substrate by wet etching.

2. The liquid crystal display panel manufacturing method as claimed in claim 1, wherein in the etching step, the wet etching is applied on the outer-side surfaces of the both glass substrates by spraying the etching solution towards the both of the raised-up glass substrates.

3. The liquid crystal display panel manufacturing method as claimed in claim 1, wherein in the etching step, the both glass substrates are placed horizontally instead of being raised up, and an etching solution is sprayed against the outer-side surfaces of the both glass substrates in a direction towards the open-end side of the slits along the length direction of the slit openings of the mask.

4. The liquid crystal display panel manufacturing method as claimed in claim 1, wherein in the etching step, the wet etching is performed by using the etching solution containing a hydrogen fluoride and a hydrochloric acid.

5. A lenticular lens manufacturing method, comprising:

a mask forming step for forming an etching mask on one side of a glass substrate; and an etching step for applying wet etching on the glass substrate on which the mask is formed, wherein:

in the mask forming step, a plurality of slit-like openings are formed in the mask, at least one of end parts of the plurality of slit-like openings in an extending direction in a plane of the mask is opened, the slit-like openings communicate with each other through the opened end parts, and the plurality of slit-like openings are arranged in parallel in the plane of the mask and facing directions of the opened end parts are aligned;

in the etching step, the glass substrate is placed in such a manner that the open-end side of the slit-like openings of the mask faces downwards and a slit length direction is aligned with a vertical direction, and the wet etching is applied to the glass substrate in this state to form a lenticular-lens recessed part which corresponds to a shape of the mask on the surface of the glass substrate and a flat part under the lenticular-lens recessed part; and residuals generated by etching the glass substrate are drained along a shape of the lenticular-lens recessed part through the opened end to be discharged from the flat part.

* * * * *